O. F. HUTCHISON.
FOLDING FOWL CRATE.
APPLICATION FILED DEC. 12, 1911.
1,036,850.
Patented Aug. 27, 1912.
3 SHEETS—SHEET 1.
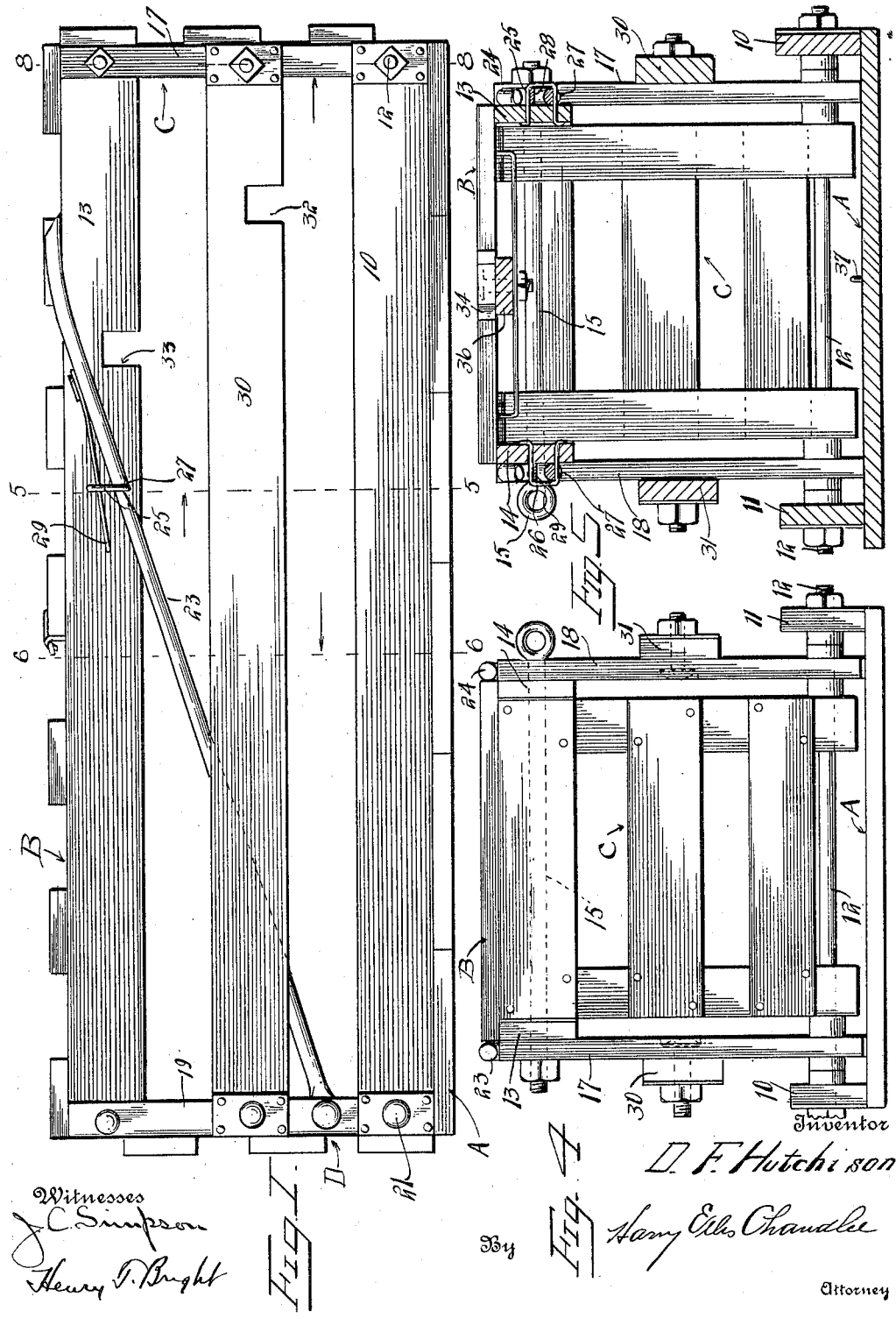

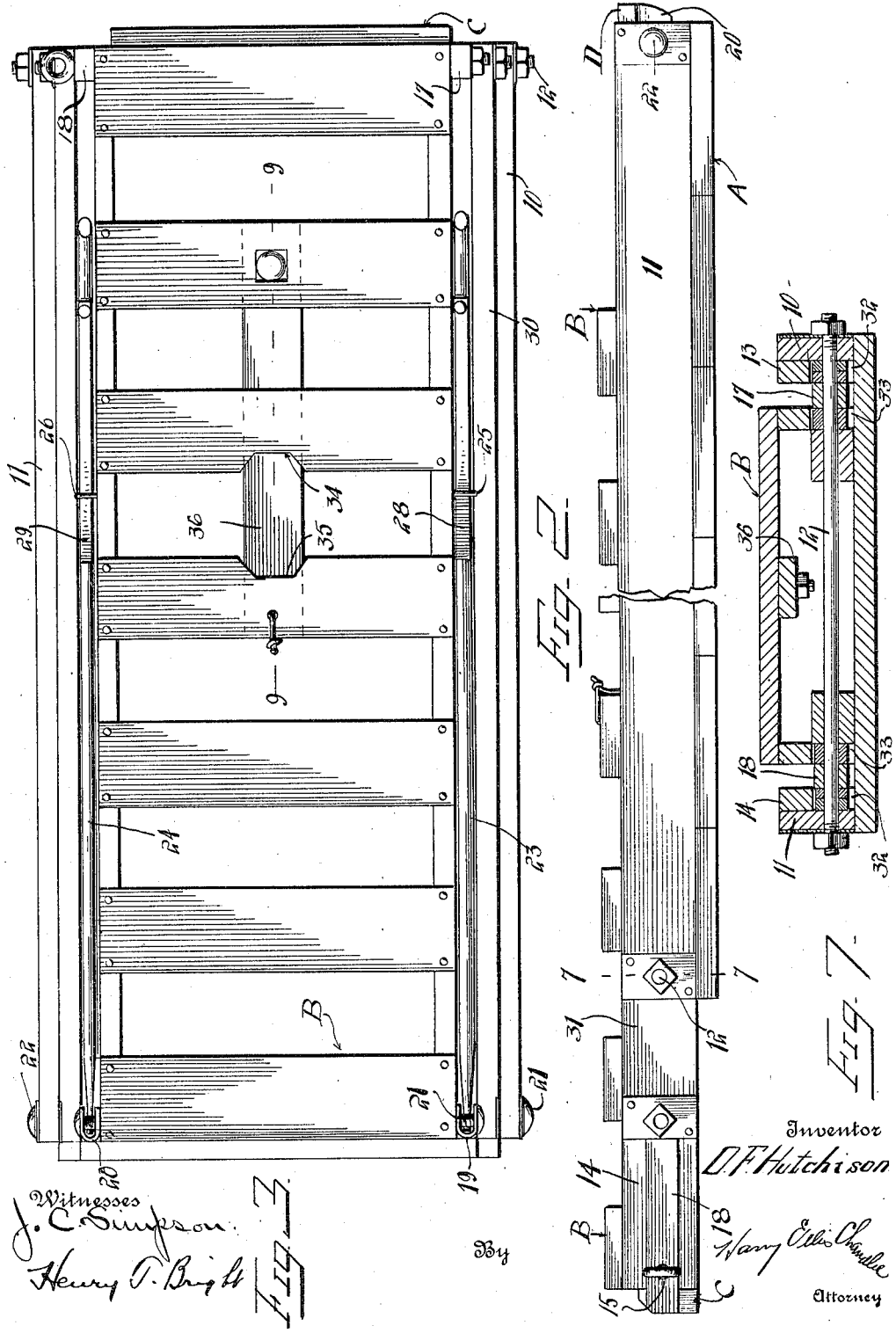

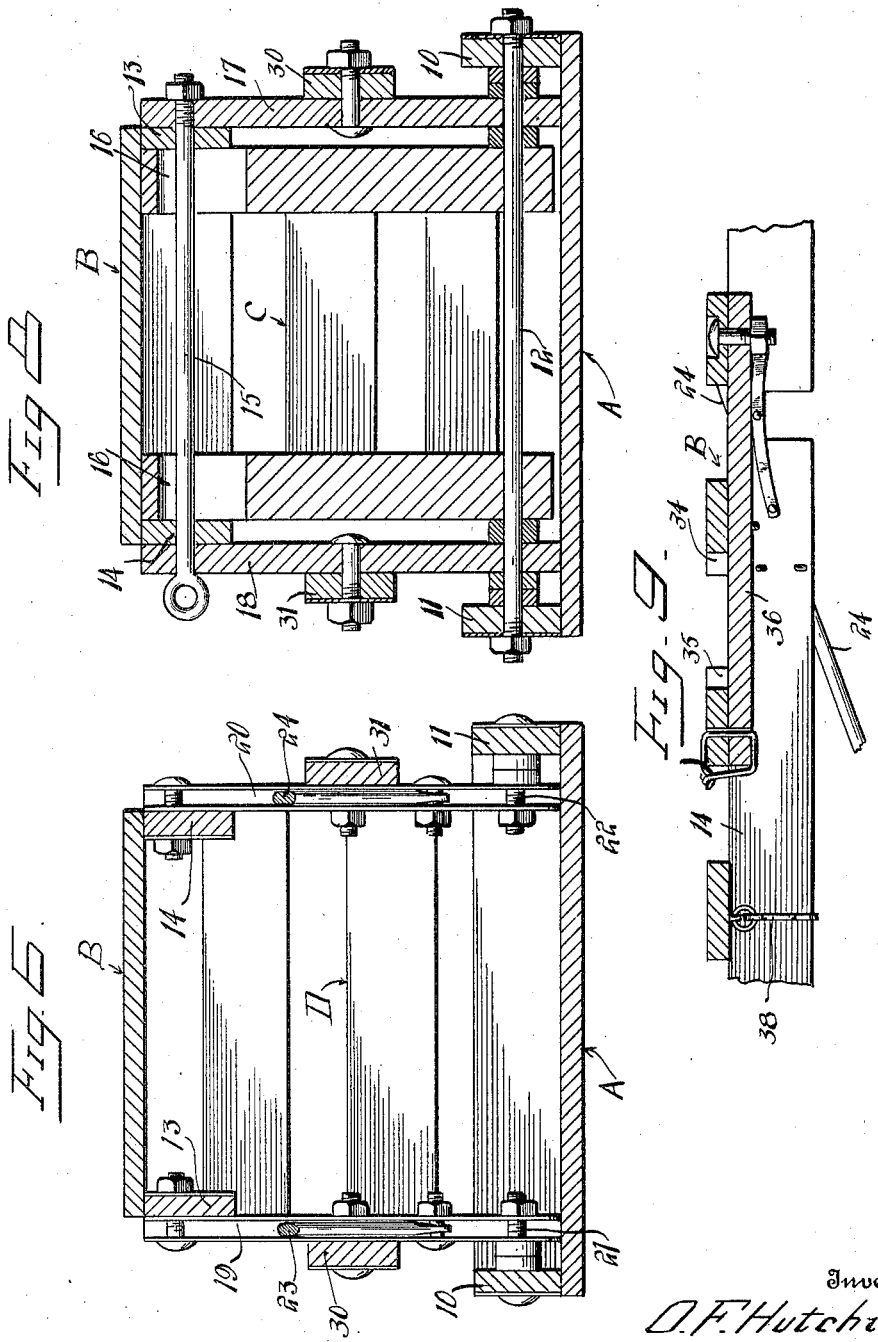

UNITED STATES PATENT OFFICE.

ORA F. HUTCHISON, OF BRITTON, OKLAHOMA.

FOLDING FOWL-CRATE.

1,036,850.  Specification of Letters Patent.  Patented Aug. 27, 1912.

Application filed December 12, 1911. Serial No. 665,345.

*To all whom it may concern:*

Be it known that I, ORA F. HUTCHISON, a citizen of the United States, residing at Britton, in the county of Oklahoma and State of Oklahoma, have invented certain new and useful Improvements in Folding Fowl-Crates, of which the following is a specification.

This invention relates to folding fowl crates.

The object of the invention resides in the provision of a fowl crate which may be easily and quickly arranged in a folded state so as to occupy a minimum space during the shipment thereof when empty.

A further object of the invention resides in the provision of a folding crate of the character referred to which will be simple in construction, easily arranged in set up or folded position, and which may be manufactured at a comparatively small cost.

With the above and other objects in view, the invention consists in the details of construction and in the arrangement and combination of parts to be hereinafter referred to and particularly pointed out in the appended claims.

In describing the invention in detail reference will be had to the accompanying drawings wherein like characters of reference denote corresponding parts in the several views, and in which—

Figure 1 is a side elevation of the invention, the same being shown set up; Fig. 2, a side elevation of the crate viewed oppositely to Fig. 1 with the crate shown in folded position, Fig. 3, a plan view of what is shown in Fig. 1, Fig. 4, an end view of the crate set up, Fig. 5, a section on the line 5—5 of Fig. 1, Fig. 6, a section on the line 6—6 of Fig. 1, Fig. 7, a section on the line 7—7 of Fig. 2, Fig. 8, a section on the line 8—8 of Fig. 1, and Fig. 9, a section on the line 9—9 of Fig. 3.

Referring to the drawings, A indicates the bottom, B the slatted top, C one of the slatted ends and D the other slatted end. The bottom A is provided along its longitudinal edges with upwardly extending side portions 10 and 11 respectively. Rotatably mounted between the side portions 10 and 11 at one end of the latter is a rod 12 which forms the pivot for the slatted end C whereby the latter may partake of the requisite swinging movement in the folding of the crate. The slatted top B also includes downwardly extending side portions 13 and 14 respectively which have mounted therein a rod 15 which extends through openings 16 in the upper ends of the side portions of the slatted end C. The ends of the rod 15 are extended beyond the side portions 13 and 14 respectively and rotatably mounted on these extensions respectively are the upper ends of bars 17 and 18 and the lower ends of these bars are mounted upon the rod 12, said bars being disposed in spaced relation to the adjacent side members of the end C as will be apparent.

The end D of the crate is shown as including side members 19 and 20, the former being disposed adjacent the inner face of the side portion 10 of the bottom and in spaced relation thereto, while the latter occupies a corresponding position with respect to the side portion 11 of the bottom. The lower end of the side member 19 is pivotally mounted upon a pin 21 suitably secured in the side portion 10 of the bottom. Likewise the lower end of the side member 20 is pivotally mounted upon a pin 22 suitably secured in the side portion 11 of the bottom. The upper ends of the side members 19 and 20 of the end D are pivotally connected respectively to the side portions 13 and 14 of the top B. It will be here noted that the side members 19 and 20 are U-shaped in cross section and pivotally connected between the arms of said side members and corresponding ends of locking rods 23 and 24 respectively. The free ends of these rods 23 and 24 are directed toward the end C of the crate and are guided through eye members 25 and 26 respectively which are secured to and project outwardly from the side portions 13 and 14 respectively of the top B. The rods 23 and 24 are provided respectively on their lower sides with cut-away portions forming resultant shoulders 27 adapted to engage respective eye members 25 and 26 in the set up position of the crate so as to lock the sections of said crate against movement to folded position. The lower sides of the rods 23 and 24 are positively forced into engagement with respective eye members 25 and 26 by means of leaf springs 28 and 29 carried by respective rods 23 and 24 and passing through respective eye members 25 and 26 so as to engage the latter under tension. The side portions of the crate are completed by means of slats 30 and 31 the former of which has its terminals pivotally connected to the bar 17 and the side member 19 respectively, while the latter has its terminals pivotally connected to the bar 18 and the side member 20 respectively. The lower edges of the slats 30 and 31 are provided respectively with recesses 32 so positioned that when the crate is folded said recesses will receive the rod 12 and permit of complete folding of the crate. Likewise the lower edges of the side portions 13 and 14 of the top are provided with recesses 33 so positioned that when the crate is folded said recesses will receive the rod 12 to permit complete folding of the crate.

In order that the crate may be filled when the latter is set up, adjacent edges of a pair of cross slats of the top are provided respectively with cutaway portions 24 and 25 to form an enlarged opening. This opening is adapted to be closed by means of a pivoted door 36 secured against the inner face of one of the cross slats and movable across the opening formed by the cutaway portions 34 and 35. This door may be secured in closing position by any suitable locking means.

In order to lock the crate in folded position there is mounted on the inner face of the bottom A an eye member 37, while a hook 38 is hung from one of the cross slats of the top B. The position of this lock is such that when the crate is folded it may be readily engaged with the eye member 37 and thus lock the crate against movement to set up position.

In order to operate the crate from the position shown in Fig. 1 to the position shown in Fig. 2 it is only necessary to elevate the free ends of the locking rods 23 and 24 against the influence of the springs 28 and 29 so as to disengage said rods from respective eye members 25 and 26. When this is done the top, end, and side portions of the crate may be operated simultaneously to the position shown in Fig. 3. In order to set up the crate it is only necessary to elevate the free ends of the end portions thereof which will in turn elevate the top B and cause the shoulders 27 to automatically engage the eye members 25 and 26 to lock the crate set up. To remove the contents of the crate quickly the rod 15 is withdrawn by unscrewing the locking nut therefrom, so as to allow the end C to fall and thereby opening one end of the crate entirely. It will of course be understood that after the end C has fallen outwardly the rod 15 is reapplied to hold the top B in place. The side portions 13 and 14 of the top B are adapted to abut the uppermost slat of the end D when the parts of the crate are in full set up position and thereby serve to prevent movement of the end D to a position beyond that assumed by said end when the parts of the crate are set up.

What is claimed is:

1. A folding fowl crate, comprising a bottom section, end sections having their lower ends pivotally connected to said bottom section, a top section having its terminals pivotally connected to the free ends of said end sections respectively, locking rods having corresponding ends pivotally connected to one of said end sections and their free ends directed toward the other end sections, eye members mounted respectively on the sides of said top member and through which the locking rods are adapted to slide respectively during the movements of the sections of the crate, said locking rods being provided with notches adapted to be engaged by respective eye members when the crate is set up to lock the sections of the latter against movement to folded position, and spring means for holding said eye members engaged in said notches.

2. A folding fowl crate, comprising a bottom section having upwardly directed side portions, a rod journaled between said side portions at one end of the latter, an end section having its lower end mounted on said rod, a second end section pivoted between the side portions of the bottom section at their other end, said second named end section including side members having U-shaped cross sections, a top section having its terminals pivotally connected to the free ends of said end sections respectively, said slats having their terminals pivotally connected with corresponding side members of said end sections, locking rods having corresponding ends pivotally mounted between the arms of respective U-shaped side members of the second named end section, and their free ends directed toward the other end section, eye members mounted respectively on the sides of said top section and through which the locking rods are adapted to slide during the pivotal movement of the sections of the crate, said locking rods being provided respectively with notches adapted to be engaged by respective eye members when the crate is set up to lock the sections of the latter against pivotal movement to folded position, and spring means for holding said eye members engaged in said notches.

3. A folding fowl crate, comprising a bottom section, end sections having their lower ends pivotally connected to said bottom section, a top section having its terminals pivotally connected to the free ends of said end sections respectively, locking rods having corresponding ends pivotally connected to one of said end sections and their free ends directed toward the other end section, eye members mounted respectively on the sides of said top member and through which the locking rods are adapted to slide respectively during the movements of the sections of the crate, said locking rods being provided respectively with notches adapted to be engaged by respective eye members when the crate is set up to lock the sections of the latter against movement to folded position, a leaf spring carried by each of said locking rods and adapted to engage respective eye members under tension in the set up position of the sections of the crate to force the locking rods against respective eye members and hold said eye members in engagement with said notches.

In testimony whereof I affix my signature, in the presence of two witnesses.

ORA F. HUTCHISON.

Witnesses:
A. W. MEYER,
RALPH CROW.

Copies of this patent may be obtained for five cents each, by addressing the "Commissioner of Patents, Washington, D. C."